A. BLOSSOM.
SHOCK ABSORBER.
APPLICATION FILED DEC. 14, 1921.
1,416,782. Patented May 23, 1922.
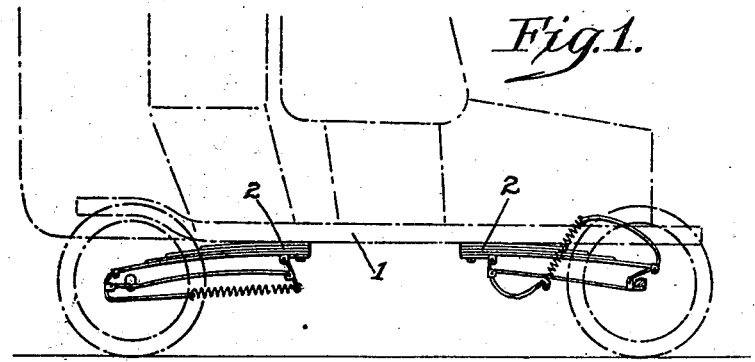
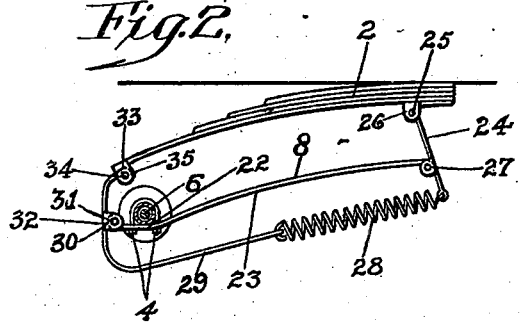
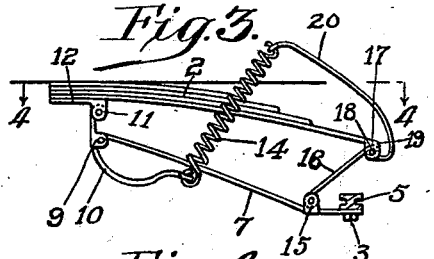
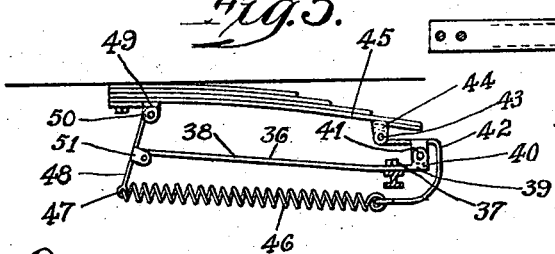
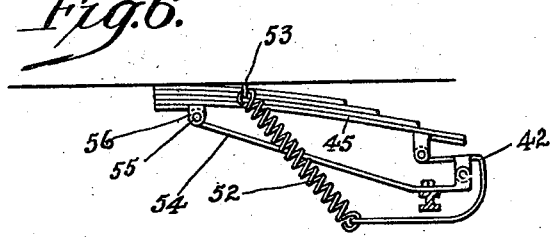
Inventor:
Alden Blossom.
by Watson E. Coleman
Attorney.

UNITED STATES PATENT OFFICE.

ALDEN BLOSSOM, OF NEWTON SQUARE, PENNSYLVANIA.

SHOCK ABSORBER.

1,416,782.

Specification of Letters Patent.     Patented May 23, 1922.

Application filed December 14, 1921. Serial No. 522,334.

*To all whom it may concern:*

Be it known that I, ALDEN BLOSSOM, a citizen of the United States, residing at Newton Square, in the county of Delaware and State of Pennsylvania, have invented certain new and useful Improvements in Shock Absorbers, of which the following is a specification, reference being had to the accompanying drawings.

The present invention has for its purpose the provision of a device of this kind for use in connection with automobiles or other vehicles for absorbing shock incident to the wheels traveling over uneven qualities or irregularities in the road bed, either the shock created by up and down motions of the axles, or the shock created by the forward and backward movements.

Another purpose is to provide a device of this kind including a bar connected to the axle having connections with the extremity of one of the yieldable end portions of the vehicle leaf springs, and also including a link connection with the rigid part of the vehicle leaf spring, in combination with a yieldable connection between said link and a portion of the bar, the construction and arrangement of said parts being such as to absorb the up and down forward and backward movements of the body of the vehicle, incident to the wheels traveling over the irregularities of road beds.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view of the outline of an automobile in dot and dash lines, showing the application of the forward and rear shock absorbers constructed in accordance with the invention;

Figure 2 is a view in elevation of the rear shock absorber;

Figure 3 is a view in elevation of the forward shock absorber;

Figure 4 is a plan view of Figure 3;

Figure 5 is a view in elevation of a modified form of the forward shock absorber;

Figure 6 is a view in elevation of still another modified form of shock absorber.

Referring to the drawings, 1 designates the body of an automobile, to which forward and rear supporting leaf springs 2 are fastened.

Secured at 3 and 4 to the forward and rear axles 5 and 6 of the automobile are bars 7 and 8. The bar 7 has one of its extremities secured to the forward axle, whereas its rear end portion which is yieldable is connected at 9 between the ears of the spring member 10. One end of the spring member is pivoted between the ears 11 of the plate 12, which is secured in any suitable manner (not shown) to the under face of the forward leaf spring 2, as shown clearly in Figures 1 and 3. The forward portion of the spring yieldable member 10 curves downwardly and forwardly and terminates in the lateral arms 13, to which the tensioned coil springs 14 are connected. The bar 7 is provided with upstanding ears 15, between which a rod or bar 16 is connected. The bar or rod 16 is in turn provided with a roll or sleeve 17, through which a pin or bolt 18 engages. In fact the bolt 18 is mounted in the ears 19 of the forward end of the forward leaf spring 2 of the vehicle, thereby supporting the rod or bar 16. A rod or bar 20 merges forwardly from the sleeve or roll 17 for a short distance and curves upwardly and extends rearwardly over the forward leaf spring 2. This rod or bar 20 terminates in lateral arms 21, to which the coil tensioned springs 14 are connected.

It will be noted that when the front wheels of the automobile strike an obstruction or unevenness or irregularity in the road bed, the forward axle 5 transmits the head on jolt through the rod or bar 7 to the rod or bar 10, the pivot or joint 9, moving backward through the downwardly and forwardly curved portion of the rod or bar 10, so as to pull upon and stretch the coil tensioned springs 14. These springs take up or absorb the shock, the vertical movement or jolt is taken up by the rod or bar 16, which moves forward and downward, thus causing the pivot or joint 18 to move downward, causing an upward and forward movement upon the rod or bar 20, which also stretches the springs 14, taking up the shock.

Again referring to Figure 2 it will be seen that the bar 8 is secured to the rear axle so as to cause the short and long arms 22 and 23 to be formed. The extremity of the forward arm 23 is connected to a rod or bar 24, which is pivoted at 25 between the ears 26, which are carried by the rear leaf spring 2 of the vehicle. The connection 27 between the extremity of the forward arm 23 and the rod or bar 24 is of a pivotal character, and the extremity of the rod or bar 24 below the pivot 27 has connected to it a tensioned coil spring 28, which in turn is connected to a rod or bar 29, which extends rearwardly and is curved upwardly, and at a point beyond the curve it is provided with ears 30. A pin 31 is mounted in the ears, and extends through a roll or sleeve 32 at the extremity of the short arm 22 of the spring bar 8, thereby mounting the bar or rod 29. The rod or bar 29 at a point above the ears 30 is curved forwardly and upwardly and terminates in a sleeve or roll 33 which receives the pin 34, which is mounted in the ears 35 of the rear end of the rear leaf spring 2 of the vehicle.

When the rear wheels of the automobile strike an obstruction or unevenness in the road bed, the head on jolt is taken from the rear axle 6. The axle 6 moves backward also pushing rod or bar 29 backwardly and upwardly, the bar or rod 29 turning upon its pivots 31 and 34, thus drawing upon the tensioned coil spring 28, which absorbs the shock. The up and down motion causes the arm 23 of the spring rod or bar 8 to raise upwardly pressing the rod or bar 24 forwardly, the shock being taken up in the tensioned coil spring 28.

Referring to Figure 5 it will be seen that the arrangement for a forward shock absorber is similar to the construction and arrangement in Figure 2, with the exception that the parts are reversed in position, and also the spring bar 36 is mounted upon and connected to the top of the forward axle at 37. This rod or bar 36 has long and short arms 38 and 39, the short arm terminates in ears 40, which are pivotally connected to the ears 41 of the spring bar or rod 42. This spring bar or rod 42 is of a U-shaped contour, the upper and lower arms of which extend rearwardly. The rear end of the upper portion of the rod or bar 42 terminates in a roll which is mounted upon a pin 43 and between the ears 44 of the forward end of the forward leaf spring 45. The rear extremity of the lower part of the spring bar or rod 42 is connected to a tensioned coil spring 46, the rear end of which is connected at 47 to a rod or bar 48, the upper end of which terminates in a sleeve or roll 49. This sleeve or roll 49 is mounted between the ears 50 of the leaf spring 45. The rod or bar 48 has ears 51, between which the rear end of the rod or bar 38 is pivotally connected.

When an irregularity or unevenness of the road bed is struck by the forward wheel, the upper portion of the rod or bar 42 moves downwardly, whereas the lower portion thereof moves forwardly and upwardly, the spring 46 absorbing the shock. When the forward axle in Figure 5 moves rearwardly and upwardly most of the former, the rod or bar 48 pushes rearwardly, which stretches the coil spring 46, additionally absorbing the shock.

Figure 6 shows a construction similar to that shown in Figure 5, and the various parts thereof are identically designated, with the exception that a tensioned coil spring 52 which is similar to the spring 46 is connected at 53 to the body of the vehicle, and also the rear end of the bar or rod 54 is connected at 55 between the ears 56 of the forward leaf spring 45 of the vehicle. When the front wheels of the automobile come in contact with an obstruction, when using the device shown in Figure 6, the rear end of the upper part of the bar or rod 42 in Figure 6 moves downwardly, whereas the lower portion of the rod or bar 42 moves upwardly and forwardly, stretching the spring 52, thereby absorbing the shock.

The invention having been set forth, what is claimed is:—

1. In a shock absorber, the combination with a leaf spring, of a vehicle, of an axle, a spring bar connected to the axle, a spring bar connecting the rear end of the first spring bar and the fixed portion of the leaf spring, an additional spring bar connecting the forward end of the leaf spring and the first spring bar, and yieldable means connecting the additional spring bar and the lower end of the second spring bar, the construction and arrangement of said yieldable means being such as to absorb the shock incident to the front wheels of the vehicle coming in contact with an obstruction.

2. In a shock absorber, the combination with a vehicle leaf spring, of an axle, of a spring bar connected to the axle having an elongated spring arm, a spring bar pivotally mounted upon the rear of the first spring bar and connected to the rear end of the leaf spring, a bar pivoted upon the extremity of the elongated arm of the first spring bar and in turn pivotally connected to the fixed portion of the leaf spring, and yieldable means connecting the last named bar, and the second spring bar, thereby absorbing the shock incident to the wheels coming in contact with an obstruction.

3. In a shock absorber, the combination with a vehicle leaf spring, of an axle, a spring bar connected to the axle and including an elongated spring arm, a second spring bar pivotally mounted on the first spring bar and being connected to the yieldable end of the leaf spring, yieldable means connected to the second named spring bar, a bar connected to the extremity of the yieldable means and pivotally connected to the extremity of the yieldable or spring arm, and in turn connected to the fixed portion of the leaf spring, whereby the yieldable means acts to absorb the shock incident to the wheels of the vehicle coming in contact with an obstruction.

4. In a shock absorber, the combination with a vehicle leaf spring, of an axle, a spring bar connected to the axle and including an elongated spring arm, a second spring bar pivotally mounted on the first spring bar and being connected to the yieldable end of the leaf spring, and having a portion extending under the spring or yieldable arm of the first spring bar, a link bar fixed to a portion of the leaf spring and in turn pivotally connected to the extremity of the yieldable or spring arm, said link bar having an extremity below its connection with the yieldable or spring arm, and yieldable means connecting said extension and the extremity of a portion of the second spring bar which extends under said yieldable spring arm.

5. In a shock absorber, the combination with a vehicle leaf spring, of an axle, a spring bar connected to the axle and including an elongated spring arm, a second spring bar pivotally mounted on the first spring bar and being connected to the yieldable end of the leaf spring, and having an extension protruding under said spring arm, and means including a yieldable device connecting said extension and the extremity of the spring arm to fixed portions of the body of the vehicle, whereby the yieldable device may absorb the shock incident to the wheels coming in contact with an obstruction.

In testimony whereof I hereunto affix my signature.

ALDEN BLOSSOM.